(12) United States Patent
Lin

(10) Patent No.: US 12,507,307 B2
(45) Date of Patent: Dec. 23, 2025

(54) USER EQUIPMENT AND CALL RECOVERY METHOD EXECUTED BY THE SAME

(71) Applicant: SAMSUNG ELECTRONICS CO., LTD., Suwon-si (KR)

(72) Inventor: Jianhua Lin, Suzhou Industrial Park (CN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 370 days.

(21) Appl. No.: 18/084,061

(22) Filed: Dec. 19, 2022

(65) Prior Publication Data

US 2023/0422331 A1 Dec. 28, 2023

(30) Foreign Application Priority Data

Jun. 27, 2022 (CN) .......................... 202210743579.5

(51) Int. Cl.
 *H04W 76/19* (2018.01)
 *H04W 76/27* (2018.01)

(52) U.S. Cl.
 CPC ........... *H04W 76/19* (2018.02); *H04W 76/27* (2018.02)

(58) Field of Classification Search
 CPC ..... H04W 76/19; H04W 76/27; H04W 80/10; H04L 65/1016
 See application file for complete search history.

(56) References Cited

U.S. PATENT DOCUMENTS

| | | | |
|---|---|---|---|
| 10,476,914 B2 | 11/2019 | Wu | |
| 10,897,790 B2 | 1/2021 | Velev et al. | |
| 10,966,260 B2 | 3/2021 | Liang et al. | |
| 11,582,268 B2 | 2/2023 | Karampatsis et al. | |
| 2020/0059980 A1 | 2/2020 | Hong et al. | |
| 2020/0137641 A1 | 4/2020 | Chauhan et al. | |
| 2020/0359254 A1 | 11/2020 | Huang-Fu et al. | |

(Continued)

FOREIGN PATENT DOCUMENTS

| | | | |
|---|---|---|---|
| CN | 101516104 A | * | 8/2009 |
| CN | 112534844 A | | 3/2021 |

(Continued)

OTHER PUBLICATIONS

Machine Translation of Liu (Year: 2023).*

(Continued)

*Primary Examiner* — Hashim S Bhatti
*Assistant Examiner* — Noah James Sugden
(74) *Attorney, Agent, or Firm* — Sughrue Mion, PLLC

(57) ABSTRACT

A user equipment and a call recovery method executed by the user equipment are provided. The call recovery method executed by the user equipment includes: determining whether a protocol data unit PDU session is activated in the user equipment UE and an access mobility management function entity AMF based on PDU session information, and determining whether there is no data radio bearer DRB for bearing International protocol multimedia subsystem IMS signaling based on radio bearer configuration information; and requesting a base station gNB to re-transmit the radio bearer configuration information including the DRB for bearing the IMS signaling if the PDU session is activated in the UE and the AMF and there is no DRB for bearing the IMS signaling.

16 Claims, 5 Drawing Sheets

(56) References Cited

U.S. PATENT DOCUMENTS

| | | | |
|---|---|---|---|
| 2021/0059003 A1 | 2/2021 | Kim et al. | |
| 2021/0218781 A1* | 7/2021 | Li et al. | |
| 2022/0103987 A1* | 3/2022 | Shan | H04W 4/40 |
| 2023/0397072 A1* | 12/2023 | Prabhakar | H04L 69/322 |
| 2023/0397281 A1* | 12/2023 | Koshta | H04W 48/18 |

FOREIGN PATENT DOCUMENTS

| | | |
|---|---|---|
| CN | 112913320 A | 6/2021 |
| CN | 114641086 A | 6/2022 |

OTHER PUBLICATIONS

"Radio Resource Control (RRC)", Protocol specification (3GPP TS 38.331 version 16.1.0 Release 16), Jul. 2020, Total 886 pages.
Office Action dated Jan. 20, 2024, issued by Chinese Patent Office in Chinese Patent Application No. 202210743579.5.

* cited by examiner

USER EQUIPMENT AND CALL RECOVERY METHOD EXECUTED BY THE SAME

CROSS-REFERENCE TO RELATED APPLICATIONS

This application is based on and claims priority under 35 U.S.C. § 119 to Chinese Patent Application No. 202210743579.5, filed on Jun. 27, 2022, in the China National Intellectual Property Administration, the disclosure of which is incorporated by reference herein in its entirety.

BACKGROUND

1. Field

The present application relates to a communication field, and more particularly, to a user equipment and a call recovery method executed by the user equipment.

2. Description of the Related Art

In recent communication networks, in which, long term evolution (LTE) and new radio (NR) radio access network (RAN) interoperate, there are still many problems in terms of the call connection rate of the user.

For example, in a case, in which, the PDU session state of the International-protocol multimedia subsystem (IMS) between the access and mobility management function entity (AMF) and the user equipment (UE) is instructed to be an activated state, the radio bearer configured for the UE by the base station (gNB) of the NR RAN network lacks the data radio bearer (DRB) for bearing the IMS signaling when the UE comes back to the NR RAN network, after the call such as the evolution packet system fall back (EPSFB) call is completed. At this time, although the UE is in a radio resource control (RRC) connection state, the UE cannot receive the session initialization protocol (SIP) signaling in time due to the lack of the DRB for bearing the IMS signaling, which makes the call connection such as Mobile Terminate (MT) call fail, and it usually needs a relatively long time to return to normal.

Therefore, the user may miss urgent or important communications, such as weather advisory, which can cause personal property to be damaged.

SUMMARY

According to an aspect of the disclosure, there is provided a call recovery method executed by a user equipment (UE), the call recovery method including: determining whether a protocol data unit (PDU) session is activated in the UE and in an access mobility management function entity (AMF) based on PDU session information; determining whether or not there is data radio bearer (DRB) for bearing International protocol multimedia subsystem (IMS) signaling based on radio bearer configuration information; and requesting a base station (gNB) to re-transmit the radio bearer configuration information including the DRB for bearing the IMS signaling based on the PDU session being activated in the UE and in the AMF and based on a determination that there is no DRB for bearing the IMS signaling.

The PDU session information may be acquired from the AMF.

The requesting the gNB to re-transmit the radio bearer configuration information including the DRB for bearing the IMS signaling includes: requesting the gNB to re-transmit the radio bearer configuration information including the DRB for bearing the IMS signaling after the PDU session is activated in the UE and the AMF and the DRB for bearing the IMS signaling does not exist for a certain time.

The requesting the gNB to re-transmit the radio bearer configuration information including the DRB for bearing the IMS signaling includes: repeating executing a radio source control (RRC) process, until the radio bearer configuration information including the DRB for bearing the IMS signaling is acquired; or repeating executing a RRC connection re-establishment (RRE) process, until the radio bearer configuration information including the DRB for bearing the IMS signaling is acquired.

The requesting the gNB to re-transmit the radio bearer configuration information including the DRB for bearing the IMS signaling includes: counting a number of times the RRC process or the RRE process is repeated, and based on the radio bearer configuration information including the DRB for bearing the IMS signaling not being acquired after the number of times exceeds a reference value, executing at least one of: determining whether to continue executing the RRC process or the RRE process, or increasing the certain time.

According to an aspect of the disclosure, there is provided a user equipment, including: a memory storing one or more instructions; and a processor configured to execute the one or more instructions to: determine whether a protocol data unit (PDU) session is activated in the UE and in an access mobility management function entity (AMF) based on PDU session information; determine whether or not there is data radio bearer (DRB) for bearing International protocol multimedia subsystem (IMS) signaling based on radio bearer configuration information; and request a base station (gNB) to re-transmit the radio bearer configuration information including the DRB for bearing the IMS signaling based on the PDU session being activated in the UE and in the AMF and based on a determination that there is no DRB for bearing the IMS signaling.

The PDU session information is acquired from the AMF.

The processor is further configured to: request the gNB to re-transmit the radio bearer configuration information including the DRB for bearing the IMS signaling after the PDU session is activated in the UE and the AMF and the DRB for bearing the IMS signaling does not exist for a certain time.

The processor is further configured to: repeat executing a radio resource control (RRC) process, until the radio bearer configuration information including the DRB for bearing the IMS signaling is acquired; or repeat executing a RRC connection re-establishment (RRE) process, until the radio bearer configuration information including the DRB for bearing the IMS signaling is acquired.

The processor is further configured to: count a number of times the RRC process or the RRE process is repeated; and based on the radio bearer configuration information including the DRB for bearing the IMS signaling not being acquired after the number of times exceeds a reference value, execute at least one of: determining whether to continue executing the RRC process or the RRE process or increasing the certain time.

According to an aspect of the disclosure, there is provided a computer-readable medium with computer-executable instructions thereon, when being executed, the method of claim 1 is executed.

According to an aspect of the disclosure, there is provided a an apparatus including: a memory storing one or more instructions; and a processor configured to execute the one or more instructions to: determine whether a protocol data unit (PDU) session is activated in the UE; determine whether data radio bearer (DRB) is available based on radio bearer configuration information; and based on the PDU session being activated in the UE and based the DRB being not available, request a base station (gNB) to re-transmit the radio bearer configuration information including the DRB.

The DRB is for bearing International protocol multimedia subsystem (IMS) signaling.

The determination of whether the PDU session is activated in the UE is based on PDU session information acquired from an access mobility management function entity (AMF).

The processor is further configured to: repeat executing a radio source control (RRC) process, until the radio bearer configuration information including the DRB is acquired; or repeat executing a RRC connection re-establishment (RRE) process, until the radio bearer configuration information including the DRB is acquired.

The processor is further configured to: count a number of times the RRC process or the RRE process is repeated; and based on the radio bearer configuration information including the DRB not being acquired after the number of times exceeds a reference value, execute at least one of: determining whether to continue executing the RRC process or the RRE process.

BRIEF DESCRIPTION OF THE DRAWINGS

The above and other purposes and features of the disclosure will become clearer, from the following detailed description, taken in conjunction with the accompanying drawings, in which.

DETAILED DESCRIPTION

Figure 1:
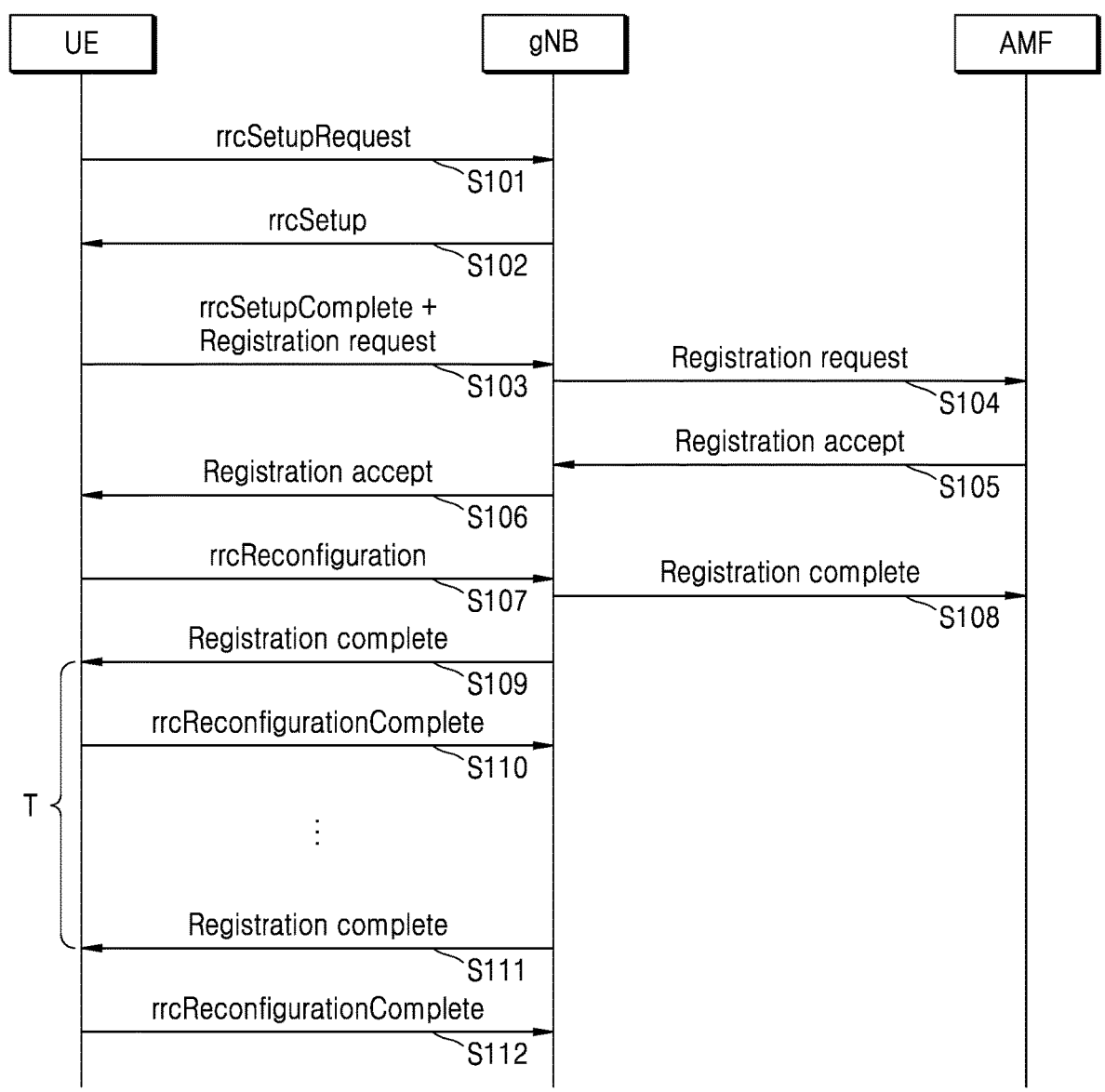
FIG. 1 is a diagram illustrating an RRC establishment process according to an exemplary embodiment of the disclosure.

The embodiment of the disclosure, an example of which is illustrated in the accompany drawings will now be referred to in detail, wherein the same reference numeral indicates the same part throughout the accompany drawings. The embodiment will be illustrated below with reference to the accompanying drawings, so as to explain the disclosure.

FIG. 1 is a diagram illustrating an RRC establishment process according to an exemplary embodiment of the disclosure.

Referring to FIG. 1, in operation S101, a user equipment (UE) may transmit an rrcSetupRequest message to a base station (gNB) to request to establish the RRC.

In operation S102, the gNB may transmit the rrcSetup message to the UE to configure the signal radio bearer (SRB).

In operation S103, the UE may transmit the rrcSetupComplete message to the gNB to complete the RRC establishment process, wherein the rrcSetupComplete message may carry the Registration Request message, for example.

In operation S104, the gNB may transmit the Registration Request message to the access and mobility management function entity (AMF) to request the registration.

In operation S105, the AMF may transmit the Registration Accept message to the gNB to instruct to accept the registration, wherein the Registration Accept message may include PDU session information.

In operation S106, the gNB may forward the Registration Accept message to the UE to inform the UE that the registration has been accepted.

In operation S107, the UE may transmit the Registration Complete message to the gNB to instruct the registration completion.

In operation S108, the gNB may transmit the Registration Complete message to the AMF to inform that the AMF registration has been completed.

In operation S109, the gNB may transmit the rrcReconfiguration message to the UE to configure the data radio bearer (DRB). According to an example embodiment, the rrcReconfiguration message may include the radio bearer configuration information including the DRB for bearing the International-protocol multimedia subsystem (IMS) signaling. Here, only as an example rather than limitation, the radio bearer configuration information may include the configuration information of the SRB and the DRB.

In operation S110, the UE may transmit the rrcReconfigurationComplete message to the gNB to complete the configuration.

According to an example embodiment, operations S111-S112 are similar to operations S109-S110, which will be omitted here. It should be understood that operations S101-S102 shown in FIG. 1 may be the RRC establishment process commonly used in the art, and may also be amended by those skilled in the art according to the practical needs.

Referring to FIG. 1, the UE may not receive the session initialization protocol (SIP) signaling since the UE is possibly not configured with the DRB for bearing the IMS signaling in operation S109, which may cause the call connection such as the MT communication to fail. According to an example embodiment, the UE may not receive the session initialization protocol (SIP) signaling when the UE is not configured with the DRB for bearing the IMS signaling in operation S109 within a specified time after operation S109. According to an example embodiment, the specified time may be predetermined time. According to an example embodiment, the specified time may be seconds or minutes.

In view of above, regarding the call failure caused by the DRB, configured by the gNB to the UE, lacking the DRB for bearing the IMS signaling, the disclosure may request the gNB to re-transmit the radio bearer configuration information including the DRB for bearing the IMS signaling through the PDU session information received in step S106 and the radio bearer configuration information received in step S109. The following will be described with reference to FIG. 2.

Figure 2:
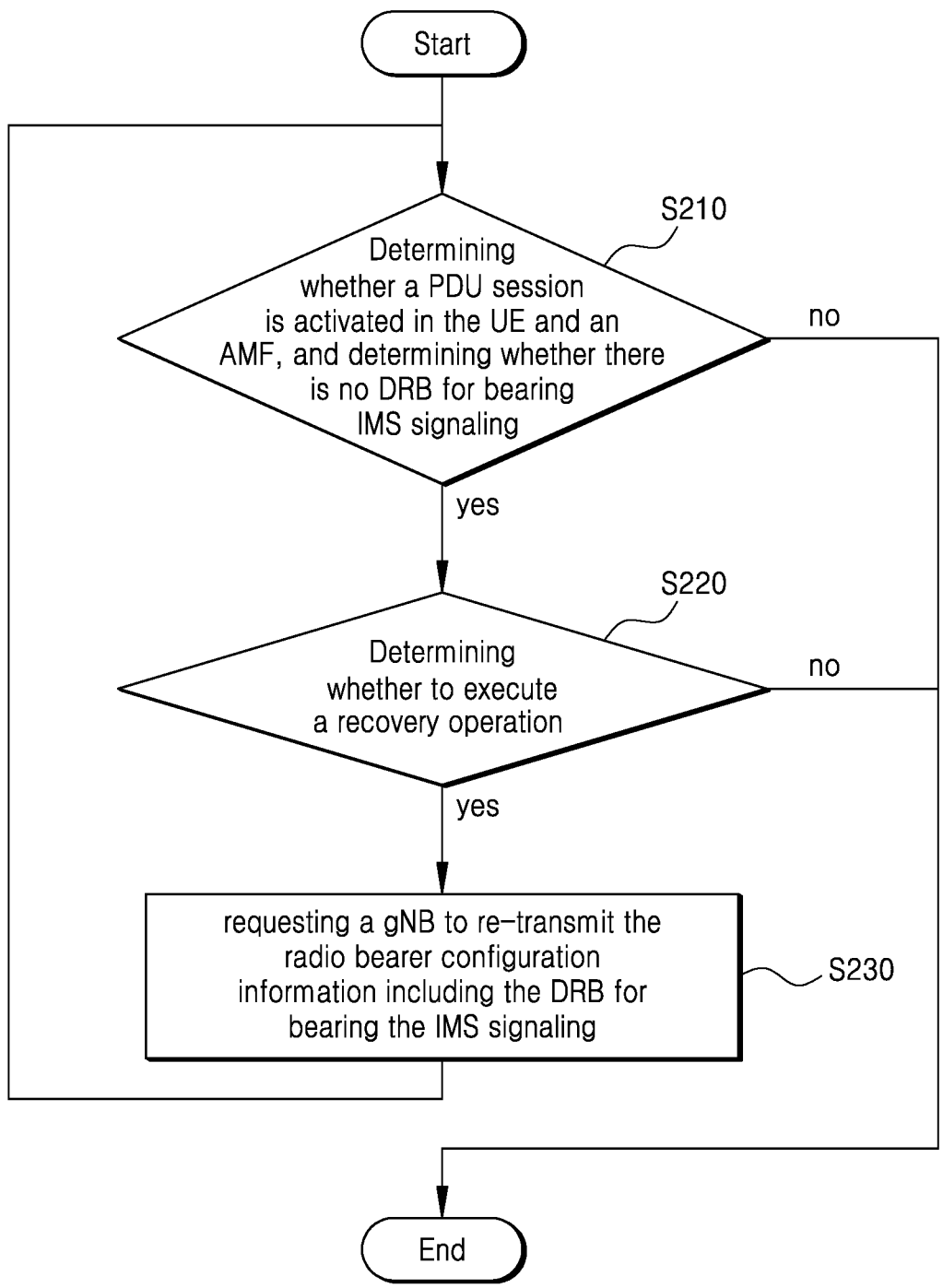
FIG. 2 is a flowchart of a call recovery method executed by the UE according to an exemplary embodiment of the disclosure.

FIG. 2 is a flowchart of a call recovery method executed by the UE according to an exemplary embodiment of the disclosure.

Referring to FIG. 2, in operation S210, the method may include determining whether a PDU session is activated in the UE and the AMF based on the PDU session information. Further, the method may include determining whether there is no DRB for bearing IMS signaling based on radio bearer configuration information. According to an embodiment, the method may include determining whether there is no DRB for bearing IMS signaling based on radio bearer configuration information within a specified time after operation S109 in FIG. 1. Here, it can be seen from FIG. 1 that the PDU session information may be acquired from the AMF, and the radio bearer configuration information may be acquired from the gNB.

If the PDU session is activated in the UE and the AMF and there is no DRB for bearing the IMS signaling (S210—yes), in operation S220, the method may include determining whether to execute the recovery operation. It should be understood that the operation S220 may be removed as a selectable operation, for example, if the PDU session is activated in the UE and the AMF and there is no DRB for bearing the IMS signaling (S210—yes), the subsequent step S230 may be executed directly.

If it is determined to execute the recovery operation (S220—yes), in operation S230, the gNB may be requested to re-transmit the radio bearer configuration information including the DRB for bearing the IMS signaling. Here, the gNB may be requested to re-transmit the radio bearer configuration information including the DRB for bearing the IMS signaling after the PDU session is activated in the UE and the AMF and the DRB for bearing the IMS signaling does not exist for a specified time. Only as an example rather than limitation, the specified time may be a predetermined time, which may be any time from zero second to several minutes, and those skilled in the art may set the predetermined time according to the practical needs.

In addition, according to an example embodiment, the requesting the gNB to re-transmit the radio bearer configuration information including the DRB for bearing the IMS signaling includes: repeating executing a radio source control (RRC) process until the radio bearer configuration information including the DRB for bearing the IMS signaling is acquired, wherein the current RRC connection may be released before each process of executing the RRC; or repeating executing a RRC connection re-establishment (RRE) process until the radio bearer configuration information including the DRB for bearing the IMS signaling is acquired. The RRC process and the RRE process will be described with reference to FIGS. 3 and 4 later.

In addition, the number of times the RRC process or the RRE process being repeated executing may also be counted, and if the radio bearer configuration information including the DRB for bearing the IMS signaling is not acquired after the number of times exceed a predetermined value, executing at least one of: determining whether to continue executing the RRC process or the RRE process; and increasing the predetermined time. Only as an example rather than limitation, stopping executing the RRC process or the RRE process may be determined or re-executing a predetermined number of times of the RRC process or the RRE process may be determined, based on that the radio bearer configuration information including the DRB for bearing the IMS signaling is not acquired after the number of times exceeds the predetermined value. Here, those skilled in the art may also set the above predetermined value according to the practical needs.

Here, it should be understood that the process may return to operation S210 to continue monitoring the PDU session and the DRB for bearing the IMS signaling after the operation S230 is executed, the entire operation may also be ended directly, and those skilled in the art may make the selection according to the practical situation.

In addition, if the PDU session is not activated in the UE or the AMF, or there is DRB for bearing the IMS signaling (S210—no), the process may be ended. In addition, if the recovery operation is determined not to be executed (S220—no), the process may be ended.

It should be understood that the call may be executed based on the radio bearer configuration information including the DRB for bearing the IMS signaling after acquiring the radio bearer configuration information.

Figure 3:
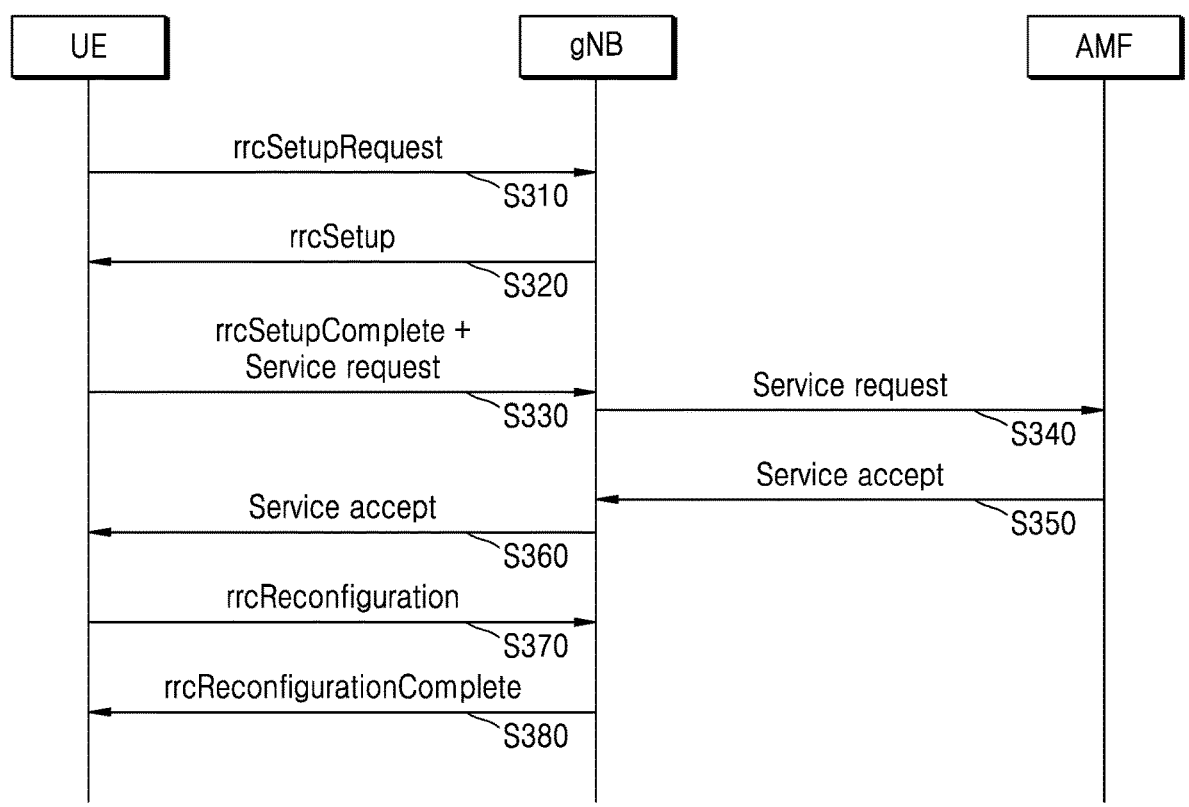
FIG. 3 is a diagram illustrating an RRC process according to an exemplary embodiment of the disclosure.

FIG. 3 is a diagram illustrating an RRC process according to an exemplary embodiment of the disclosure.

With reference to FIG. 3, in operation S310, the UE may release the current RRC connection to transmit the rrcSetupRequest message to the gNB to request the RRC.

In operation S320, the gNB may transmit the rrcSetup message to the UE to configure the SRB.

In operation S330, the UE may transmit the rrcSetupComplete message to the gNB to complete the RRC establishment process. According to an example embodiment, the rrcSetupComplete message may carry the non-access stadium (NAS) message, such as the Service Request message. According to an example embodiment, the Service Request message may instruct the PDU session state corresponding to the IMS to be an activated state.

In operation S340, the gNB may transmit the Service Request message to the AMF to request service.

In operation S350, the AMF may transmit the Service Accept message to the gNB to instruct to accept the request, and the related configuration information will also be transmitted to the gNB.

In operation S360, the gNB may forward the Service Accept message to the UE to inform UE that the request has been accepted.

In operation S370, the gNB may transmit the rrcReconfiguration message to the UE to configure the DRB. According to an example embodiment, the rrcReconfiguration message may include the radio bearer configuration information including the DRB for bearing the IMS signaling.

In operation S380, the UE may transmit the rrcReconfigurationComplete message to the gNB to complete the configuration.

It should be understood that operations S310-S380 shown in FIG. 3 may be the RRC process used in the related art, and may also be amended by those skilled in the art according to the practical needs.

Figure 4:
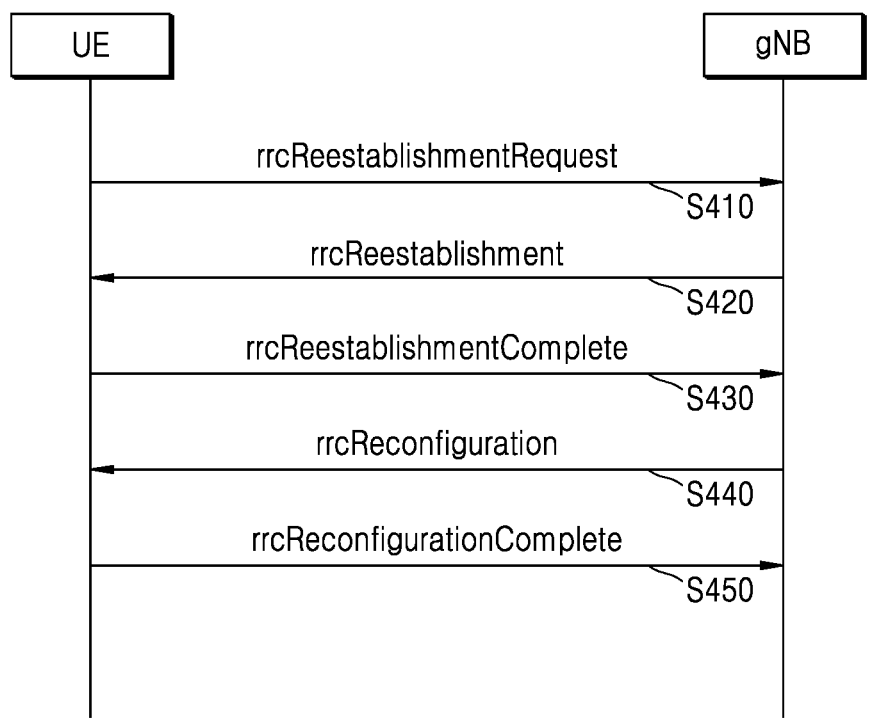
FIG. 4 is a diagram illustrating an RRE process according to an exemplary embodiment of the disclosure.

FIG. 4 is a diagram illustrating an RRE process according to an exemplary embodiment of the disclosure.

Referring to FIG. 4, in operation S410, the UE may transmit the rrcReestablishmentRequest message to the gNB to request the RRE.

In operation S420, the gNB may transmit the rrcReestablishment message to the UE to re-establish the RRC connection.

In operation S430, the UE may transmit the rrcReestablishmentComplete message to the gNB to complete the RRE process, to inform the gNB that the RRC connection re-establishment has been completed.

In operation S440, the gNB may transmit the rrcReconfiguration message to the UE to configure the DRB. According to an example embodiment, the rrcReconfiguration message may include the radio bearer configuration information including the DRB for bearing the IMS signaling.

In operation S450, the UE may transmit the rrcReconfigurationComplete message to the gNB to complete the configuration.

It should be understood that operations S410-S450 shown in FIG. 4 may be the RRE process commonly used in the art, and may also be amended by those skilled in the art according to the practical needs.

Here, with respect to the two processes of FIGS. 3 and 4, they may both trigger the gNB to re-configure the radio bearer configuration information, but the RRC process of FIG. 3 will take more time, and may also have a better performance than that of the RRE process of FIG. 4.

Figure 5:
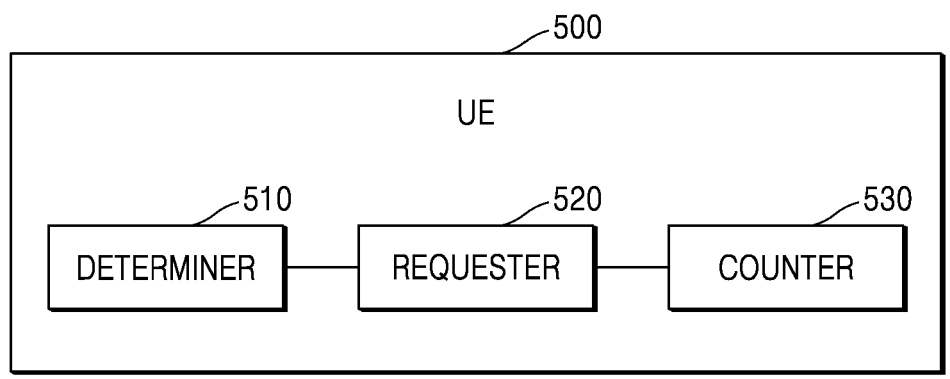
FIG. 5 is a block diagram of a user equipment according to an exemplary embodiment of the disclosure.

FIG. 5 is a block diagram of a user equipment according to an exemplary embodiment of the disclosure.

Referring to FIG. 5, a user equipment 500 according to an exemplary embodiment of the disclosure may include a determiner 510, a requester 520, and a counter 530. According to an example embodiment, the determiner, the requester 520, and the counter 530 may be implemented by hardware, software or a combination of hardware and software.

According to an example embodiment, the user equipment 500 may include one or more memories and one or more processors, and the determiner, the requester 520, and the counter 530 may be implement by the one or more processors. For instance, the one or more memories may store instructions or program code, and the one or more processors may execute the one or more instructions or program code to implement the determiner 510, the requester 520, and the counter 530. However, the disclosure is not limited thereto, and as such, according to another example embodiment, one or more electronic circuits and components may be configured to implement the determiner 510, the requester 520, and the counter 530.

The determiner 510 may be configured to determine whether a PDU session is activated in the user equipment UE and an access mobility management function entity AMF based on PDU session information, and determine whether there is no DRB for bearing International protocol multimedia subsystem IMS signaling based on radio bearer configuration information.

The requester 520 may be configured to request a base station (gNB) to re-transmit the radio bearer configuration information including the DRB for bearing the IMS signaling if the PDU session is activated in the UE and the AMF and there is no DRB for bearing the IMS signaling. Here, the requester 520 may further be configured to request the gNB to re-transmit the radio bearer configuration information including the DRB for bearing the IMS signaling after the PDU session is activated in the UE and the AMF and the DRB for bearing the IMS signaling does not exist for a predetermined time. More particularly, the requester 520 may further be configured to execute: repeating executing the RRC process, until the radio bearer configuration information including the DRB for bearing the IMS signaling is acquired, wherein the current RRC connection may be released before each process of executing the RRC; or repeating executing the RRE process, until the radio bearer configuration information including the DRB for bearing the IMS signaling is acquired.

The counter 530 may be configured to count the number of times the RRC process or the RRE process being repeated is executed. According to an example embodiment, the requester 520 may further be configured to: if the radio bearer configuration information including the DRB for bearing the IMS signaling is not acquired after the number of times exceeds a predetermined value, execute at least one of: determining whether to continue executing the RRC process or the RRE process; and increasing the predetermined time.

In addition, the user equipment 500 according to an exemplary embodiment of the disclosure may also include: a caller, which may be configured to execute a call based on the radio bearer configuration information including the DRB for bearing the IMS signaling.

In addition, according to an exemplary embodiment of the disclosure, there may also be provided an electronic equipment, including a memory, a storage, and a processor, the storage storing computer-executable instructions, when being executed by the processor, the preceding method is executed. Further, one or more components included in the example embodiments described above may be a circuit such as an Application Specific Integrated Circuit (ASIC), a Field Programmable Gate Array (FPGA), or the like configured to implement the function of each component. According to an exemplary embodiment of the disclosure, there may also be provided a computer-readable medium with computer-executable instructions thereon, when being executed, the preceding method is executed. Examples of the computer-readable storage medium include magnetic media including hard disks, magnetic tapes, and floppy disks, optical media including CD-ROMs and DVDs, magneto-optical media including optical disks, and a hardware apparatus designed to store and execute the programmed commands in ROM, RAM, a flash memory, and the like.

According to an exemplary embodiment of the disclosure, the problem of call failure may be avoided when the UE in the NR RAN lacks the DRB for bearing the IMS signaling, which may improve the call success rate, and bring a better use experience to the user.

Although the disclosure has been shown and described with reference to particular exemplary embodiments, it will be understood by those skilled in the art that various changes in form and details may be made without departing from the spirit and scope of the disclosure as defined by the claims and the equivalents thereof

What is claimed is:

1. A call recovery method executed by a user equipment (UE), the call recovery method comprising:
   determining whether a protocol data unit (PDU) session is activated in the UE and in an access and mobility management function entity (AMF) based on PDU session information;
   determining whether or not there is data radio bearer (DRB) for bearing International protocol multimedia subsystem (IMS) signaling based on radio bearer configuration information; and
   requesting a base station (gNB) to re-transmit the radio bearer configuration information including the DRB for bearing the IMS signaling based on the PDU session being activated in the UE and in the AMF and based on a determination that there is no DRB for bearing the IMS signaling.

2. The call recovery method executed by the UE of claim 1, wherein the PDU session information is acquired from the AMF.

3. The call recovery method executed by the UE of claim 1, wherein the requesting the gNB to re-transmit the radio bearer configuration information including the DRB for bearing the IMS signaling comprises:
   requesting the gNB to re-transmit the radio bearer configuration information including the DRB for bearing the IMS signaling after the PDU session is activated in the UE and the AMF and the DRB for bearing the IMS signaling does not exist for a certain time.

4. The call recovery method executed by the UE of claim 3, wherein the requesting the gNB to re-transmit the radio bearer configuration information including the DRB for bearing the IMS signaling comprises:
   repeating executing a radio resource control (RRC) process, until the radio bearer configuration information including the DRB for bearing the IMS signaling is acquired; or repeating executing a RRC connection re-establishment (RRE) process, until the radio bearer configuration information including the DRB for bearing the IMS signaling is acquired.

5. The call recovery method executed by the UE of claim 4, wherein the requesting the gNB to re-transmit the radio bearer configuration information including the DRB for bearing the IMS signaling comprises:
counting a number of times the RRC process or the RRE process is repeated, and based on the radio bearer configuration information including the DRB for bearing the IMS signaling not being acquired after the number of times exceeds a reference value, executing at least one of: determining whether to continue executing the RRC process or the RRE process, or increasing the certain time.

6. A user equipment (UE), comprising:
a memory storing one or more instructions; and
a processor configured to execute the one or more instructions to:
determine whether a protocol data unit (PDU) session is activated in the UE and in an access and mobility management function entity (AMF) based on PDU session information;
determine whether or not there is data radio bearer (DRB) for bearing International protocol multimedia subsystem (IMS) signaling based on radio bearer configuration information; and
request a base station (gNB) to re-transmit the radio bearer configuration information including the DRB for bearing the IMS signaling based on the PDU session being activated in the UE and in the AMF and based on a determination that there is no DRB for bearing the IMS signaling.

7. The user equipment of claim 6, wherein the PDU session information is acquired from the AMF.

8. The user equipment of claim 6, wherein the processor is further configured to:
request the gNB to re-transmit the radio bearer configuration information including the DRB for bearing the IMS signaling after the PDU session is activated in the UE and the AMF and the DRB for bearing the IMS signaling does not exist for a certain time.

9. The user equipment of claim 7, wherein the processor is further configured to:
repeat executing a radio resource control (RRC) process, until the radio bearer configuration information including the DRB for bearing the IMS signaling is acquired; or
repeat executing a RRC connection re-establishment (RRE) process, until the radio bearer configuration information including the DRB for bearing the IMS signaling is acquired.

10. The user equipment of claim 9, wherein the processor is further configured to: count a number of times the RRC process or the RRE process is repeated; and
based on the radio bearer configuration information including the DRB for bearing the IMS signaling not being acquired after the number of times exceeds a reference value, execute at least one of: determining whether to continue executing the RRC process or the RRE process or increasing the certain time.

11. A non-transitory computer-readable medium with computer-executable instructions thereon, when being executed, the method of claim 1 is executed.

12. An apparatus comprising:
a memory storing one or more instructions; and
a processor configured to execute the one or more instructions to:
determine whether a protocol data unit (PDU) session is activated in a user equipment (UE);
determine whether data radio bearer (DRB) is available based on radio bearer configuration information; and
based on the PDU session being activated in the UE and based the DRB being not available, request a base station (gNB) to re-transmit the radio bearer configuration information including the DRB.

13. The apparatus of claim 12, wherein the DRB is for bearing International protocol multimedia subsystem (IMS) signaling.

14. The apparatus of claim 12, wherein the determination of whether the PDU session is activated in the UE is based on PDU session information acquired from an access and mobility management function entity (AMF).

15. The apparatus of claim 12, wherein the processor is further configured to:
repeat executing a radio resource control (RRC) process, until the radio bearer configuration information including the DRB is acquired; or
repeat executing a RRC connection re-establishment (RRE) process, until the radio bearer configuration information including the DRB is acquired.

16. The apparatus of claim 12, wherein the processor is further configured to:
count a number of times the RRC process or the RRE process is repeated; and
based on the radio bearer configuration information including the DRB not being acquired after the number of times exceeds a reference value, execute at least one of: determining whether to continue executing the RRC process or the RRE process.

* * * * *